(12) United States Patent
Scharfe et al.

(10) Patent No.: US 6,695,907 B2
(45) Date of Patent: Feb. 24, 2004

(54) DISPERSIONS CONTAINING PYROGENIC OXIDES

(75) Inventors: Thomas Scharfe, Alzenau (DE); Rainer Golchert, Dieburg (DE); Helmut Mangold, Rodenbach (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/295,895

(22) Filed: Nov. 18, 2002

(65) Prior Publication Data

US 2003/0118499 A1 Jun. 26, 2003

Related U.S. Application Data

(63) Continuation of application No. 09/829,014, filed on Apr. 10, 2001, now abandoned.

(30) Foreign Application Priority Data

Apr. 12, 2000 (EP) .......................................... 00 107 817

(51) Int. Cl.$^7$ .................. C04B 14/94; C04B 35/16; C09F 9/00; C01B 33/12; C01B 13/14
(52) U.S. Cl. .................. 106/482; 106/287.34; 501/154; 423/335; 423/592; 423/606; 423/608; 423/625
(58) Field of Search ............................ 106/482, 287.34; 501/154; 423/335, 592, 606, 608, 625

(56) References Cited

U.S. PATENT DOCUMENTS

| 4,286,990 | A | 9/1981 | Kleinschmit et al. ...... 106/73.4 |
| 4,482,642 | A | 11/1984 | Ettlinger et al. ............ 502/232 |
| 5,002,918 | A | 3/1991 | Deller et al. ................ 502/263 |
| 5,021,378 | A | 6/1991 | Deller et al. .................. 502/62 |
| 5,116,535 | A | 5/1992 | Cochrane et al. ............. 516/86 |
| 5,776,240 | A | 7/1998 | Deller et al. ................ 106/482 |
| 5,827,363 | A | 10/1998 | Darsillo et al. ............. 106/484 |
| 5,858,906 | A | 1/1999 | Deller et al. ................ 502/170 |
| 6,328,944 | B1 | 12/2001 | Mangold et al. ............ 423/278 |

FOREIGN PATENT DOCUMENTS

| CA | 2223377 | 6/1998 |
| EP | 0 850 876 | 7/1998 |

*Primary Examiner*—Mark L. Bell
*Assistant Examiner*—Patricia L Hailey
(74) *Attorney, Agent, or Firm*—Pillsbury Winthrop LLP

(57) ABSTRACT

Dispersions of pyrogenic oxides, doped using an aerosol, are prepared by mixing the oxide with a suspending agent and milling. The dispersions can be used to prepare inkjet paper.

18 Claims, No Drawings

DISPERSIONS CONTAINING PYROGENIC OXIDES

This is a Continuation of National application Ser. No. 09/829,014 filed Apr. 10, 2001, now abandoned.

CROSS REFERENCE TO RELATED APPLICATIONS

The present application claims priority to Europen application 00107817.9 filed on Apr. 12, 2000, the subject matter of which is hereby incorporated by reference.

FIELD OF THE INVENTION

The present invention is directed to dispersions, a process for preparing these dispersions and their use in the preparation of coating mixtures for inkjet media.

BACKGROUND OF THE INVENTION

It is known that dispersions, for example water-based dispersions, can be prepared from pyrogenically prepared oxides. Aqueous dispersions can be used to prepare coating mixtures which are applied to paper or films. The coated films may then be printed using an inkjet printer. In this case, one objective is to obtain dispersions which are filled as highly as possible (high solids content) but with a low viscosity.

SUMMARY OF THE INVENTION

The invention provides dispersions which are characterised in that they consist of a liquid phase, preferably water, and a solid phase. The solid phase consists of a pyrogenic oxide, doped using an aerosol, the BET surface area of which is between 5 and 600 $m^2/g$. The pyrogenic oxide preferably comprises silica prepared by the method of flame hydrolysis or flame oxidation and which has been doped with one or more doping component(s). Preferably the doping component is an aluminium oxide, and doping is accomplished by the method of aerosol application, in which the amount of doped material is between 1 and 200,000 ppm and the doping component(s) are applied via a salt or a salt mixture. The solid phase in the dispersion should be present in a proportion by weight between 0.001 and 80 wt. %.

The invention also provides a process for preparing chemical dispersions in which a pyrogenic oxide, doped using an aerosol, is introduced into a liquid, preferably water, in a proportion by weight of between 0.001 and 80 wt. %. This dispersion is then subjected to a milling step, which may be performed using a ball mill, a pearl mill, a high-pressure mill, or any other known mill, preferably using a dispersing system in accordance with the rotor-stator principle (Ultra-Turrax™).

The invention also provides for the use of dispersions in preparing coating mixtures (particularly for inkjet papers, inkjet films or other inkjet materials), as a ceramic raw material, in the electrical industry, as a polishing agent (CMP applications), in the cosmetics industry, in the silicone and rubber industry, to adjust the rheology of liquid systems, as a starting material for preparing glass or glass coatings or melting crucibles, in dentistry, in the pharmaceutical industry, in PET film applications, as a starting material for preparing filter ceramics or filters, as a rust prevention agent, in inks and in battery separators.

One advantage of using highly filled, i.e., dense, and low viscosity dispersions such as those described herein in paper production (i.e., in the preparation of mixtures for coating papers and other media) is that proportionately less water has to be evaporated in the drying step after applying the dispersion (coating mixture). This provides a saving in energy.

DETAILED DESCRIPTION OF THE INVENTION

Example

Preparation of a Pyrogenic Silicon Oxide Doped Using an Aerosol

EP 850 876 discloses pyrogenic oxides which are based on silicon dioxide and which have been doped with one or more components. Doping takes place by introducing an aerosol to the flame. In the example below, a pyrogenic silica doped with aluminium oxide is prepared in accordance with the process described in that patent. From this doped pyrogenic silica, a highly filled aqueous dispersion is prepared which has a low viscosity. Additional components are then added to make coating mixtures which are applied to a film and printed with an inkjet printer. The films prepared in this way have excellent print quality.

A doped pyrogenically prepared silicon dioxide is prepared in a burner arrangement like the one described in EP 0 850 876, in accordance with example 2 in that patent. 85 kg/h of $SiCl_4$ are evaporated, mixed with 51 $Nm^3/h$ of hydrogen and with 70 $Nm^3/h$ of a nitrogen/oxygen mixture (containing 35 vol. % $O_2$, remainder $N_2$) and fed into the central tube in the burner. The gas mixture flows out of a nozzle and burns in a water-cooled combustion chamber. 4 $Nm^3/h$ of (jacket) hydrogen flows out of the jacket nozzle which surrounds the central nozzle, in order to avoid incrustations. 70 $Nm^3/h$ of secondary air are also introduced into the combustion chamber.

An aerosol flows into the central tube out of an axial tube located therein. The aerosol is produced by atomising a 15% aqueous $AlCl_3$ solution using a two-fluid nozzle. An aerosol flow of 1 kg/h (aqueous salt solution) is produced in which a carrier gas stream of 16 $Nm^3/h$ of air conveys the aerosol through a heating section. The air/aerosol gas mixture then enters the central tube from the axial tube at about 180° C. The aerosol is burned together with the air/$SiCl_4$ mixture. The reaction gases and the pyrogenically prepared silica doped with aluminium oxide are removed under suction through a cooling system, and cooled by applying a reduced pressure. The solid material (doped pyrogenic oxide) is separated from the gas stream in a filter or a cyclone.

The doped pyrogenically prepared silica is produced as a white, finely divided powder. Adhering residues of hydrochloric acid are removed by treatment at elevated temperature with air which contains water vapour. The pyrogenic silicon dioxide doped using an aerosol has the following physico-chemical characteristics:

| | |
|---|---|
| BET: | 60 $m^2/g$ |
| pH (4% aqu. disp.): | 3.9 |
| Compacted bulk density: | 142 g/l |
| Chloride content: | 180 ppm |
| $Al_2O_3$ content | 0.19 wt. % |
| DBP absorption: | 73 g/100 g |

(DBP: dibutyl phthalate)

An aqueous dispersion is prepared with the doped pyrogenic oxide. A commercially available Aerosils (pyrogenically prepared silica) provided by Degussa-Hüls AG/Frankfurt, OX 50 and Aerosil 90, are used as comparison examples. Table 1 gives the characteristics of the oxides:

TABLE 1

Physico-chemical characteristics of the doped pyrogenic oxide

| | Doped pyrogenic oxide according to example | OX 50 | Aerosil 90 |
|---|---|---|---|
| BET $m^2/g$ | 60 | 50 | 90 |
| pH (4% aqu. disp.) | 3.9 | 3.8–4.8 | 3.7–4.7 |
| Compacted bulk density g/l | 142 | 130 | 80 |
| Chloride content ppm | 180 | <250 | <250 |
| $Al_2O_3$ content wt. % | 0.19 | <0.08 | 0.05 |
| $SiO_2$ content wt. % | 99.8 | >99.8 | >99.8 |

An aqueous dispersion is prepared using these three different pyrogenic oxides. This is achieved using a rotor-stator system (Ultra-Turrax™) with a dispersion time of 30 minutes in a double-walled vessel with water cooling. It is attempted to prepare a 40% (with respect to solids) dispersion (w=0.40). This dispersion may also be prepared using other equipment, e.g., ball mills or pearl mills or various types of jet or high-pressure mills (jets of liquid directed towards each other). It is shown that it is not possible to produce a 40% dispersion with Aerosil 90 using this system because the system is too highly viscous. The viscosity of the dispersions prepared in this way (doped oxide and Aerosil OX 50) is measured after 2 h with a Brookfield viscometer.

TABLE 2

Viscosity of the 40% aqueous dispersion

| | Doped pyrogenic oxide according to example 1 | OX 50 | Aerosil 90: not possible to prepare a 40% dispersion using Ultra-Turrax |
|---|---|---|---|
| 5 rpm | 2420 | 2320 | >10,000 |
| 10 rpm | 1520 | 1320 | |
| 20 rpm | 970 | 745 | |
| 50 rpm | 554 | 372 | |
| 100 rpm | 370 | 256 | | rpm = revolutions per minute of the Brookfield viscometer

Inkjet coating mixtures are prepared from these 40% aqueous dispersions. Formulation for preparing an inkjet coating mixture is as follows. Two dispersions, A and B, are prepared. Dispersion A is a 40% (w=0.40) aqueous dispersion which contains the pyrogenic oxide (or the doped pyrogenic oxide). This is made by dispersing the pyrogenic oxide or doped oxide for 30 minutes with an Ultra-Turrax system in a water-cooled double-jacket system.

Dispersion B is a 10% (with respect to PVA) aqueous dispersion of polyvinyl alcohol (solid, abbreviated as PVA), Mowiol 26-88 from the Clariant Co. The two dispersions A and B are combined over the course of 10 minutes by stirring at 500 rpm with a dissolver disc to give a dispersion C. Dispersions A and B are mixed in such a way that a ratio by weight of Aerosil (or doped pyrogenic oxide) to PVA of 100:20 is produced in subsequent dispersion C. In the case of a 40% dispersion A, this is mixed with dispersion B in the ratio by weight of 1.25:1 in order to achieve the required ratio by weight (100:20 for the solids). Furthermore (if required) enough water is added to produce a 24% dispersion C, with respect to the sum of the solids (pyrogenic oxide+PVA). The viscosity of this dispersion C, the inkjet coating mixture, is measured after 24 h using a Brookfield viscometer.

TABLE 3

Viscosity of the coating mixture measured after 24 h

| | Doped oxide according to example 1 | OX 50 | Aerosil 90 |
|---|---|---|---|
| Solids content of the coating mixture (pyrogenic oxide + PVA) wt. % | 24 | 24 | 22.5 |
| Viscosity [mPas] at 100 rpm | 3244 | 685 | 3352 |

(Note:
In the case of preparing the coating mixture from Aerosil 90, a 30% aqueous dispersion is used initially.)

These coating mixtures are applied to an untreated polyester film (thickness 100 micrometers) with the aid of a shaped spreading rod. The wet film thickness of the coating mixture is 120 micrometers. The coating is dried at 105° C. for 8 minutes. The film with the applied coating is printed on an Epson Stylus Colour 800 using the highest resolution.

TABLE 4

Assessing the printing results

| | Doped pyrogenic oxide according to example 1 | | OX 50 | | Aerosil 90 | |
|---|---|---|---|---|---|---|
| Property assessed | Assessment | Score | Assessment | Score | Assessment | Score |
| Colour intensity | good | 2 | adequate | 4 | satisfactory | 3 |
| Resolution | very good | 1 | satisfactory | 3 | good | 2 |
| Colour running (bleeding) | no bleeding | 1 | fairly pronounced bleeding | 4 | small amount of bleeding | 2.5 |
| Drying time | very short | 1 | short | 2.5 | very short | 1 |
| Adhesion to film | good | 2 | good | 2 | poor | 5 |
| Average | very good to good | 1.4 | satisfactory | 3.1 | satisfactory | 2.7 |

Best score 1, poorest score 6.

Taking the sum of all the properties of the coatings, in particular with regard to print quality, the aqueous dispersion prepared from the doped oxide, the coating mixture produced from this dispersion and the coating produced from this dispersion exhibit by far the best results for printing with an inkjet printer and have a very short drying time. The viscosity of the aqueous dispersion of the doped oxide is much lower than that of a dispersion of Aerosil 90, with which, for example, a 40% aqueous dispersion cannot be prepared using this method.

In the case of Aerosil OX 50, which has a comparable BET surface area to that of the doped oxide, although an aqueous dispersion can be prepared which has a similar viscosity to that of the doped oxide, the print quality of the layer therefrom is not of acceptable quality. Using the dispersion according to the invention, it is also possible to obtain a high solids content in the coating mixture which means that much less energy has to be expended when drying the coating.

Comparing the results of coating mixtures shown in table 4, it can be seen that the doped oxide provides by far the best printing results. The film adhesion of the coating mixture prepared from the aqueous dispersion according to the invention was also very good. Although dispersions made with Aerosil OX 50 also have a relatively low viscosity, the print quality of the coating mixtures, or coatings, prepared therefrom is not acceptable.

What is claimed is:

1. A dispersion comprising a liquid phase and a solid phase, wherein the solid phase comprises a pyrogenic oxide, and wherein said pyrogenic oxide:

a) is doped with one or more doping components; and
   b) has a BET surface area of between 5 and 600 $m^2/g$.

2. The dispersion of claim 1, wherein said pyrogenic oxide is silica.

3. The dispersion of claim 1, wherein said liquid phase is water.

4. The dispersion of any one of claims 1–3, wherein said pyrogenic oxide is prepared by the method of flame hydrolysis or flame oxidation.

5. The dispersion of any one of claims 1–3, wherein said pyrogenic oxide is doped using an aerosol.

6. The dispersion of any one of claims 1–3, wherein said pyrogenic oxide is doped with aluminum oxide.

7. The dispersion of claim 6, wherein the amount of doped material in said pyrogenic oxide is between 1 and 200,000 ppm.

8. The dispersion of claim 7, wherein said doped material is applied as a salt or a salt mixture.

9. The dispersion of claim 6, wherein the solid phase in the dispersion is present in a proportion by weight of between 0.001 and 80 wt. %.

10. The dispersion of any one of claims 1–3, wherein the amount of doped material in said pyrogenic oxide is between 1 and 200,000 ppm.

11. The dispersion of any one of claims 1–3, wherein the solid phase in the dispersion is present in a proportion by weight of between 0.001 and 80 wt. %.

12. A process for preparing a dispersion according to claim 1, comprising:

a) mixing a doped pyrogenic oxide with a liquid; and
   b) milling the mixture produced in step a).

13. The process of claim 12, wherein said liquid is water and said pyrogenic oxide is silica.

14. The process of claim 12, wherein said pyrogenic oxide is present in said liquid in a proportion by weight of between 0.001 and 80 wt. %.

15. The process of claim 12, wherein said milling procedure is performed using an ball mill.

16. The process of claim 12, wherein said milling procedure is performed using a pearl mill.

17. The process of claim 12, wherein said milling procedure is performed using a high pressure milling mixture.

18. A coating mixture for an inkjet paper or inkjet film comprising the dispersion of claim 1.

* * * * *

(12) EX PARTE REEXAMINATION CERTIFICATE (6361st)

United States Patent
Scharfe et al.

(10) Number: US 6,695,907 C1
(45) Certificate Issued: Aug. 12, 2008

(54) DISPERSIONS CONTAINING PYROGENIC OXIDES

(75) Inventors: Thomas Scharfe, Alzenau (DE); Rainer Golchert, Dieburg (DE); Helmut Mangold, Rodenbach (DE)

(73) Assignee: Degussa AG, Duesseldorf (DE)

Reexamination Request:
No. 90/007,682, Aug. 19, 2005

Reexamination Certificate for:
Patent No.: 6,695,907
Issued: Feb. 24, 2004
Appl. No.: 10/295,895
Filed: Nov. 18, 2002

Related U.S. Application Data

(63) Continuation of application No. 09/829,014, filed on Apr. 10, 2001, now abandoned.

(30) Foreign Application Priority Data

Apr. 12, 2000 (EP) .......................................... 00107817

(51) Int. Cl.
*B41M 5/50* (2006.01)
*B41M 5/52* (2006.01)
*C01B 33/00* (2006.01)
*C01B 33/141* (2006.01)
*C09D 17/00* (2006.01)

(52) U.S. Cl. .................... 106/482; 106/287.34; 501/154; 423/335; 423/606; 423/608; 423/625

(58) Field of Classification Search ................. 106/482, 106/287.3; 501/154; 428/32.34
See application file for complete search history.

(56) References Cited

U.S. PATENT DOCUMENTS

| 5,847,028 | A | * | 12/1998 | Iwase et al. | ................. 523/414 |
| 5,967,964 | A | | 10/1999 | Hattori | |
| 6,328,944 | B1 | | 12/2001 | Mangold | |
| 6,592,970 | B2 | | 7/2003 | Ohta | |
| 2003/0185739 | A1 | | 10/2003 | Mangold | |

FOREIGN PATENT DOCUMENTS

| DE | 19650500 A1 | * | 6/1998 |
| DE | 19847161 A1 | * | 4/2000 |

OTHER PUBLICATIONS

Decision from the US Court of Appeals for the Federal Circuit, Case No. 06–1087, *Nichols Institute Diagnostics, Inc., v. Scantibodies Clinical Laboratory, Inc., and Scantibodies Laboratory, Inc.*, Decided Sep. 20, 2006.

* cited by examiner

*Primary Examiner*—Sharon Turner

(57) ABSTRACT

Dispersions of pyrogenic oxides, doped using an aerosol, are prepared by mixing the oxide with a suspending agent and milling. The dispersions can be used to prepare inkjet paper.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2–3, 6, 9–11, 13 and 14 are cancelled.

Claims 1, 4–5, 7 and 12 are determined to be patentable as amended.

Claims 8 and 15–18, dependent on an amended claim, are determined to be patentable.

1. [A] *An aqueous* dispersion comprising a liquid phase and a solid phase, wherein the solid phase comprises a pyrogenic oxide *which is silica doped with aluminum oxide*, and wherein said pyrogenic oxide:

[a) is doped with one or more doping components; and b)] has a BET surface area between 5 and 600 m²/g

*said dispersion having been milled, and having a solids content of 40 to 80 wt. %.*

4. The dispersion of [any one of claims 1–3] *claim 1*, wherein said pyrogenic oxide is prepared by the method of flame hydrolysis or flame oxidation.

5. The dispersion of [any one of claims 1–3] *claim 1*, wherein said pyrogenic oxide is doped using an aerosol.

7. The dispersion of claim [6] *1* wherein the amount of doped material in said pyrogenic oxide is between 1 and 200,000 ppm.

12. A process for preparing [a] *the aqueous* dispersion according to claim 1, comprising:

a) mixing [a doped] *said* pyrogenic oxide *as a solid phase* with a liquid *to form an aqueous dispersion with a solids content of 40 to 80 wt. %*; and b) milling the [mixture] *aqueous dispersion* produced in step a).

\* \* \* \* \*